United States Patent
Kato et al.

(10) Patent No.: US 9,708,445 B2
(45) Date of Patent: Jul. 18, 2017

(54) POLYCARBONATE RESIN USABLE AS OIL-ADSORBING MATERIAL

(71) Applicant: MITSUBISHI GAS CHEMICAL COMPANY, INC., Tokyo (JP)

(72) Inventors: Noriyuki Kato, Tokyo (JP); Manabu Hirakawa, Tokyo (JP)

(73) Assignee: MITSUBISHI GAS CHEMICAL COMPANY, INC., Tokyo (JP)

(*) Notice: Subject to any disclaimer, the term of this patent is extended or adjusted under 35 U.S.C. 154(b) by 0 days.

(21) Appl. No.: 14/915,731

(22) PCT Filed: Sep. 12, 2014

(86) PCT No.: PCT/JP2014/074183
§ 371 (c)(1),
(2) Date: Mar. 1, 2016

(87) PCT Pub. No.: WO2015/041158
PCT Pub. Date: Mar. 26, 2015

(65) Prior Publication Data
US 2016/0194440 A1    Jul. 7, 2016

(30) Foreign Application Priority Data

Sep. 20, 2013   (JP) ................... 2013-195098

(51) Int. Cl.
| | |
|---|---|
| C08G 63/02 | (2006.01) |
| C08G 64/02 | (2006.01) |
| C02F 1/28 | (2006.01) |
| C02F 1/68 | (2006.01) |
| C08G 64/30 | (2006.01) |
| B01J 20/26 | (2006.01) |
| C09K 3/32 | (2006.01) |
| C02F 101/32 | (2006.01) |
| C02F 103/00 | (2006.01) |

(52) U.S. Cl.
CPC ........ *C08G 64/0208* (2013.01); *B01J 20/262* (2013.01); *C02F 1/285* (2013.01); *C02F 1/681* (2013.01); *C08G 64/305* (2013.01); *C09K 3/32* (2013.01); *C02F 2101/32* (2013.01); *C02F 2103/007* (2013.01)

(58) Field of Classification Search
CPC .................................... C08G 64/00

USPC ................................. 405/63; 521/172, 174
See application file for complete search history.

(56) References Cited

U.S. PATENT DOCUMENTS

| 5,621,065 | A | 4/1997 | Pudleiner et al. |
| 2005/0090637 | A1 | 4/2005 | Kawa et al. |
| 2011/0272183 | A1 | 11/2011 | Ooga et al. |
| 2011/0293374 | A1* | 12/2011 | Mohmeyer ............. C02F 1/681 405/63 |

FOREIGN PATENT DOCUMENTS

| JP | 8-283399 | 10/1996 |
| JP | 9-137185 | 5/1997 |
| JP | 9-316436 | 12/1997 |
| JP | 10-231360 | 9/1998 |
| JP | 2000-17045 | 1/2000 |
| JP | 2005-508998 | 4/2005 |
| JP | 2010-179222 | 8/2010 |
| JP | 2010-248346 | 11/2010 |
| JP | 2011-148886 | 8/2011 |
| WO | 2010/084872 | 7/2010 |

OTHER PUBLICATIONS

International Search Report issued in PCT/JP2014/074183 on Oct. 7, 2014.

* cited by examiner

*Primary Examiner* — Terressa Boykin
(74) *Attorney, Agent, or Firm* — Greenblum and Bernstein, P.L.C.

(57) ABSTRACT

The present invention provides a polycarbonate resin that contains a repeating unit represented by formula (1). (In the formula, a, b, c and d are each an integer of 0 or higher, and a+b+c+d=12 to 48 inclusive.) Furthermore, the present invention provides an oil-absorbing material that uses the polycarbonate resin.

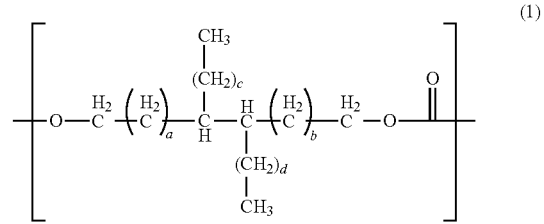

9 Claims, No Drawings

POLYCARBONATE RESIN USABLE AS OIL-ADSORBING MATERIAL

TECHNICAL FIELD

The present invention relates to a novel polycarbonate resin that can be utilized as an oil-adsorbing material.

BACKGROUND ART

Marine pollutions due to petroleum spill, for example, the oil spill from the Gulf War in 1991 and the oil spill in the Gulf of Mexico in 2010, are continuing to cause environmental damage. This is because hazardous components such as an aromatic compound contained in the crude oil released in water are diffused and inflict extensive damage to living organisms.

Therefore, if by any chance such spill is caused, there is a need to rapidly recover the oil before it is carried away by the ocean current and diffuses.

Conventional methods for recovering oil that leaked into the ocean, rivers, lakes and the like have owed to oil adsorptive storage, recovery through gelation, or a combination thereof.

Specifically, adsorptive storage refers to recovery by trapping the oil in the gap between fiber or microparticles.

Conventionally, layers of non-woven fabric made from natural fiber or synthetic fiber (Patent Document 1), urethane foam or fine-grained mineral (calcined and foamed) (Patent Document 2) have been widely used.

Gelation refers to a recovery method in which the oil is gelated using resin acids or metallic soaps such as metallic salts of rosins (Patent Document 3). In addition, oil-adsorbing materials that use a polynorbornene resin or a styrene-butadiene copolymer have also been developed (Patent Document 4).

According to the recovery method by adsorptively storing the oil in the gap in non-woven fabric or foam, however, water may as well be absorbed simultaneously with the oil, which may impair the absorption efficiency. Moreover, since the force for retaining the absorbed oil is low, there is also a problem that the absorbed oil may ooze and be released due to external pressure applied during transportation for recovery.

Although oil recovery by a method of gelating the oil is effective since it allows the oil to be selectively absorbed, it has a problem in that a raw material of the oil-adsorbing material, i.e., a resin such as polynorbornene, is expensive. Furthermore, since degradation of the resin can be caused during storing, for example, an additive for preventing such degradation needs to be added, resulting in a problem of high cost. Additionally, since gelation, which is effective in the case of a small amount of leakage, requires stirring, it is unsuitable when a large amount of oil needs to be recovered, for example, upon a crude oil spill incident.

Moreover, although an oil dispersant was used for handling unrecovered crude oil upon a major incident like the oil spill in the Gulf of Mexico in 2010, since an oil dispersant is made of a surfactant and an organic solvent, the adverse influences of the dispersed components on the ecological system are currently still posing a problem.

Meanwhile, Patent Documents 5-7 describe a polycarbonate diol and a carbonate system compound similar to the material focused by the present inventors, but they do not describe about a purpose or an application for oil recovery and thus completely lack description about the oil absorption. Furthermore, the molecular weights of these polymers are all as low as 10,000 or less.

PRIOR ART DOCUMENTS

Patent Documents

[Patent Document 1] Japanese Patent Laid-open Publication No. 2010-179222
[Patent Document 2] Japanese Patent Laid-open Publication No. 2000-17045
[Patent Document 3] Japanese Patent Laid-open Publication No. H09-316436
[Patent Document 4] Japanese Patent Laid-open Publication No. H09-137185
[Patent Document 5] Japanese Patent Laid-open Publication No. H10-231360
[Patent Document 6] WO2010/084872
[Patent Document 7] Japanese Patent Laid-open Publication No. 2010-248346

SUMMARY OF THE INVENTION

Problems to be Solved by the Invention

The present invention has an objective of providing an oil-adsorbing material that exhibits low water absorption and high oil absorption, that allows easy recovery of the absorbed oil and that has no adverse impact even if it is dispersed in the environment.

Means for Solving the Problems the present inventors found that a polycarbonate resin having a specific structure exhibits low water absorption and high oil absorption and thus can favorably be used as an oil-adsorbing material, thereby accomplishing the present invention. Specifically, the present invention is as follows.

<1> A polycarbonate resin comprising a repeating unit represented by Formula (1):

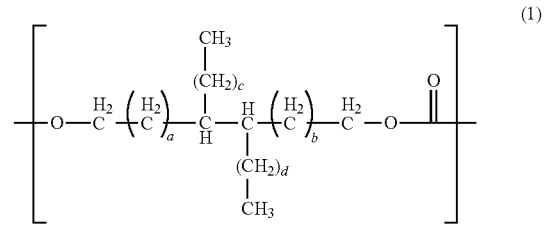

(wherein a, b, c and d are each an integer of 0 or higher, and a+b+c+d is 12 to 48, inclusive).

<2> The polycarbonate resin according to <1> above, comprising only the repeating unit represented by Formula (1).
<3> The polycarbonate resin according to <1> or <2> above, wherein a+b+c+d is 30.
<4> The polycarbonate resin according to any one of <1> to <3> above, which has a solid body at 25° C.
<5> The polycarbonate resin according to <4> above, wherein the weight-average molecular weight is 70,000 to 500,000 in terms of polystyrene.
<6> The polycarbonate resin according to any one of <1> to <3> above, which has a viscous body at 25° C.

<7> The polycarbonate resin according to <6> above, wherein the weight-average molecular weight is 10,000 to 30,000 in terms of polystyrene.
<8> The polycarbonate resin according to any one of <1> to <7> above, whose specific gravity is less than 1 g/cm$^3$.
<9> A method for producing the polycarbonate resin according to any one of <1> to <8> above, comprising a step of using a dihydroxy compound represented by Formula (2) below as a raw material:

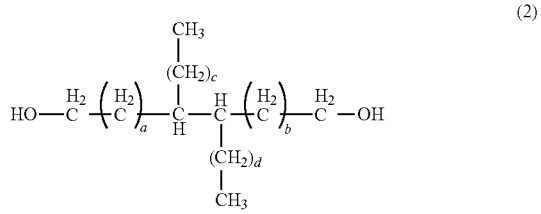

(wherein, a, b, c and d are each an integer of 0 or higher, and a+b+c+d is 12 to 48, inclusive).
<10> A molded product that uses the polycarbonate resin according to any one of <1> to <8> above.
<11> An oil-absorbing material that uses the polycarbonate resin according to any one of <1> to <8> above.

Effect of the Invention

A polycarbonate resin of the present invention can be used as an oil-adsorbing material that exhibits low water absorption and high oil absorption, and that has no adverse impact even if it is dispersed in the environment.

MODES FOR CARRYING OUT THE INVENTION

Hereinafter, the present invention will be described in detail.
<Method for Producing Polycarbonate Resin>
A polycarbonate resin of the present invention can be produced by a melt polycondensation process in which a diol compound (hydroxy compound) and diester carbonate, as raw materials, are reacted in the presence of a basic compound catalyst, a transesterification catalyst or a mixed catalyst containing both of them.
<Diol as Raw Material>
According to the present invention, a diol represented by Formula (2) is used as a raw material.

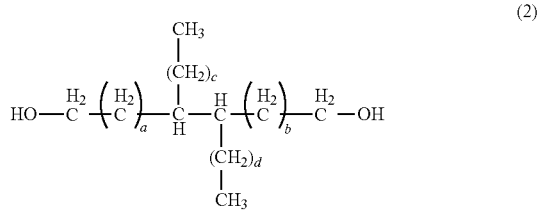

(wherein a, b, c and d are each an integer of 0 or higher, and a+b+c+d is 12 to 48, inclusive).
A compound represented by Formula (2) above wherein a+b+c+d is 30 is preferable.

<Diester Carbonate as Raw Material>
Examples of diester carbonate include diphenyl carbonate, ditolyl carbonate, bis(chlorophenyl)carbonate and m-cresyl carbonate. Among them, diphenyl carbonate is particularly preferable. Diester carbonate is preferably used in a ratio of 0.50-2.00 moles to 1 mole of the total dihydroxy compound, and further it is preferably used in a ratio of 1.00-1.05 moles in order to obtain a high molecular weight polymer.
<Catalyst>
Basic compound catalysts and transesterification catalysts that are favorable to be used in the present invention are listed below.
Examples of the basic compound catalyst include alkali metal compounds, alkaline-earth metal compounds and nitrogen-containing compounds.
Specific examples of the alkali metal compound used include sodium hydroxide, potassium hydroxide, cesium hydroxide, lithium hydroxide, sodium hydrogen carbonate, sodium carbonate, potassium carbonate, cesium carbonate, lithium carbonate, sodium acetate, potassium acetate, cesium acetate, lithium acetate, sodium stearate, potassium stearate, cesium stearate, lithium stearate, sodium borohydride, phenylated boron sodium, sodium benzoate, potassium benzoate, cesium benzoate, lithium benzoate, disodium hydrogen phosphate, dipotassium hydrogen phosphate, dilithium hydrogen phosphate, disodium phenyl phosphate, disodium salt, dipotassium salt, dicesium salt and dilithium salt of bisphenol A, and sodium salt, potassium salt, cesium salt and lithium salt of phenol.
Specific examples of the alkaline-earth metal compound used include magnesium hydroxide, calcium hydroxide, strontium hydroxide, barium hydroxide, magnesium hydrogen carbonate, calcium hydrogen carbonate, strontium hydrogen carbonate, barium hydrogen carbonate, magnesium carbonate, calcium carbonate, strontium carbonate, barium carbonate, magnesium acetate, calcium acetate, strontium acetate, barium acetate, magnesium stearate, calcium stearate, calcium benzoate and magnesium phenyl phosphate.
Specific examples of the nitrogen-containing compound used include quaternary ammonium hydroxides having an alkyl group, an aryl group or the like, such as tetramethylammonium hydroxide, tetraethylammonium hydroxide, tetrapropylammonium hydroxide, tetrabutylammonium hydroxide, benzyltrimethylammonium hydroxide; tertiary amines such as triethylamine, dimethylbenzylamine and triphenylamine; secondary amines such as diethylamine and dibutylamine; primary amines such as propylamine and butylamine; imidazoles such as 2-methylimidazole, 2-phenylimidazole and benzimidazole; and bases or basic salts such as ammonia, tetramethylammonium borohydride, tetrabutylammonium borohydride, tetrabutylammonium tetraphenylborate and tetraphenylammonium tetraphenylborate.
As the transesterification catalyst, salts of zinc, tin, zirconium and lead can preferably be used, which may be used alone or in combination.
Specific examples of the transesterification catalyst used include zinc acetate, zinc benzoate, zinc 2-ethylhexanoate, tin (II) chloride, tin (IV) chloride, tin (II) acetate, tin (IV) acetate, dibutyltin dilaurate, dibutyltin oxide, dibutyltin dimethoxide, zirconium acetylacetonate, zirconium oxyacetate, zirconium tetrabutoxide, lead (II) acetate and lead (IV) acetate.
These catalysts are used at a ratio of $1\times10^{-9}$-$1\times10^{-3}$ moles and preferably at a ratio of $1\times10^{-7}$-$1\times10^{-4}$ moles with respect to 1 mole of the total dihydroxy compound.

<Other Raw Materials>

In addition, the polycarbonate resin of the present invention may be added with various known additives in accordance with the purpose as long as its physical properties are not impaired.

Examples of such additives include an antioxidant, an ultraviolet absorber, a mold release agent, a flame retardant, an antistatic, a pigment and a dye, which may be used alone or in combination as appropriate.

Examples of the antioxidant include phosphite compounds such as triphenyl phosphite, tris(4-methylphenyl)phosphite, tris(4-t-butylphenyl)phosphite, tris(monononylphenyl)phosphite, tris(2-methyl-4-ethylphenyl)phosphite, tris(2-methyl-4-t-butylphenyl)phosphite, tris(2,4-di-t-butylphenyl)phosphite, tris(2,6-di-t-butylphenyl)phosphite, tris (2,4-di-t-butyl-5-methylphenyl)phosphite, tris(mono-,di-nonylphenyl)phosphite, bis(monononylphenyl)pentaerythritol-di-phosphite, bis(2,4-di-t-butylphenyl)pentaerythritol-di-phosphite, bis(2,6-di-t-butyl-4-methylphenyl)pentaerythritol-phosphite, bis(2,4,6-di-t-butylphenyl)pentaerythritol-di-phosphite, bis(2,4-di-t-butyl-5-methylphenyl)pentaerythritol-di-phosphite, 2,2-methylenebis(4,6-dimethylphenyl)octyl phosphato, 2,2-methylenebis(4-t-butyl-6-methylphenyl)octyl phosphite, 2,2-methylenebis(4,6-di-t-butylphenyl) octyl phosphite, 2,2-methylenebis(4,6-dimethylphenyl)hexyl phosphite, 2,2-methylenebis(4,6-di-t-butylphenyl)hexyl phosphite and 2,2-methylenebis(4,6-di-t-butylphenyl)stearyl phosphite; hindered phenol compounds such as pentaerythrityl-tetrakis [3-(3,5-di-t-butyl-4-hydroxyphenyl)propionate], 1,6-hexanediol-bis[3-(3,5-di-t-butyl-4-hydroxyphenyl)propionate], octadecyl-3-(3,5-di-t-butyl-4-hydroxyphenyl) propionate, 1,3,5-trimethyl-2,4,6-tris(3,5-di-t-butyl-4-hydroxybenzyl)benzene, triethylene glycol-bis[3-(3-t-butyl-5-methyl-4-hydroxyphenyl)propionate], 3,9-bis(2-[3-(3-t-butyl-4-hydroxy-5-methylphenylpropionyloxy]-1,1-dimethylethyl-2,4,8,10-tetraoxaspiro[5,5]undecane and 1,1,3-tris[2-methyl-4-(3,5-di-t-butyl-4-hydroxyphenylpropionyloxy)-5-t-butylphenyl]butane; and 5,7-di-t-butyl-3-(3,4-dimethylphenyl)-3H-benzofuran-2-one. They may be used alone or two or more of them may be used in combination.

An additive amount of such antioxidant is preferably 0.005-0.1 parts by weight, more preferably 0.01-0.08 parts by weight and still more preferably 0.01-0.05 parts by weight with respect to 100 parts by weight of the polycarbonate resin of the present invention. Either too small or too large additive amount of the antioxidant may not result a desired effect.

Examples of the ultraviolet absorber include 2-(5-methyl-2-hydroxyphenyl)benzotriazole, 2-[2-hydroxy-3,5-bis(α,α-dimethylbenzyl)phenyl]-2H-benzotriazole, 2-(3,5-di-t-butyl-2-hydroxyphenyl)benzotriazole, 2-(3-t-butyl-5-methyl-2-hydroxyphenyl)-5-chlorobenzotriazole, 2-(3,5-di-t-butyl-2-hydroxyphenyl)-5-chlorobenzotriazole, 2-(3,5-di-t-amyl-2-hydroxyphenyl)benzotriazole, 2-(2'-hydroxy-5'-t-octylphenyl)benzotriazole, 2,2'-methylenebis[4-(1,1,3,3-tetramethylbutyl)-6-[(2H-benzotriazole-2-yl)phenol]], 2-(4,6-diphenyl-1,3,5-triazine-2-yl)-5-[(hexyl)oxy]-phenol, 2,4-dihydroxybenzophenone, 2-hydroxy-4-n-octyloxybenzophenone and 2-hydroxy-4-methoxy-2'-carboxybenzophenone. They may be used alone or two or more of them may be used in combination.

The mold release agent may be any generally used mold release agent and examples include natural or synthetic paraffin, silicone oil, polyethylene waxes, beeswax, stearic acid and fatty acid esters such as stearic acid monoglyceride, stearyl stearate, palmitic acid monoglyceride, behenyl behenate, pentaerythritol distearate and pentaerythriol tetrastearate, which may be used alone or two or more of them may be used in combination.

<Synthesis Conditions>

In a melt polycondensation process according to the present invention, melt polycondensation is carried out by using the above-described raw materials and catalysts in transesterification reaction by heating under ordinary pressure or reduced pressure while removing by-products. The reaction is usually carried out in a multistep process that includes two or more steps.

Specifically, the first reaction step is carried out at a temperature of 120-260° C., preferably 180-240° C. for 0.1-5 hours, preferably 0.5-3 hours. Then, a dihydroxy compound and diester carbonate are reacted while increasing the reaction temperature and increasing the reduced pressure in the reaction system to carry out polycondensation reaction under a final reduced pressure of 133.3 Pa or less at a temperature of 200-350° C. for 0.05-2 hours. Such a reaction may be conducted continuously or in batches. A reaction device used upon the above-described reaction may be a vertical type equipped with an anchor type impeller, a Maxblend impeller, a helical ribbon type impeller or the like, a horizontal type equipped with a paddle blade, a lattice blade, a spectacle-shaped blade or the like, or an extruder type equipped with a screw. Moreover, a reaction device having a suitable combination of them considering the viscosity of the polymer is preferably used.

<Polycarbonate Resin>

A polycarbonate resin of the present invention has a repeating unit represented by Formula (1):

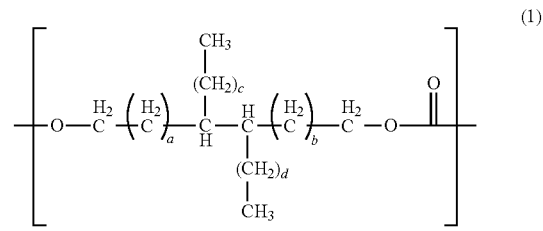

(wherein a, b, c and d are each an integer of 0 or higher, and a+b+c+d is 12 to 48, inclusive).

Preferably, a polycarbonate resin of the present invention is a resin that consists only of the repeating unit represented by Formula (1). Preferably, it is a polycarbonate resin represented by Formula (1) wherein a+b+c+d is 30.

A polycarbonate resin produced according to the present invention has a viscosity that largely varies according to the molecular weight, and can be produced into a desired shape from a highly viscous liquid to an elastic solid body with hardness.

A weight-average molecular weight of a polycarbonate resin of the present invention is preferably 5000 to 1,000,000. In order to produce a viscous body, the weight-average molecular weight of the polycarbonate resin is preferably 10,000 to 30,000, more preferably 11,000 to 25,000 and particularly preferably 12,000 to 20,000.

On the other hand, in order to produce an elastic solid body, the weight-average molecular weight of the polycarbonate resin is preferably 70,000 to 500,000, more preferably 90,000 to 400,000 and particularly preferably 100,000 to 350,000.

Furthermore, whether it is a viscous body or a solid body is judged at room temperature (25° C.).

A dihydroxy compound represented by Formula (2) wherein a+b+c+d is 30 can also be produced from a plant material. Since a polycarbonate resin produced from such a dihydroxy compound has a proportion of the plant material of 90-95%, it consists of a very high biomass content and thus can be used as a biomass plastic.

Also, it can be added to other raw material for the purpose of improving the resin so that not only an effect of improving the resin but also an effect of increasing the biomass content can be achieved.

<Oil Absorption>

A polycarbonate resin of the present invention absorbs oil well. The type of the oil may be, for example, petroleum and oils derived from petroleum, vegetable oils, animal oils and fats and the like.

Petroleum and oils derived from petroleum are primarily a hydrocarbon compound, and representative examples include naphtha, petroleum ether, gasoline, benzine, white gasoline, heating oil, light oil, kerosene, jet fuel, diesel fuel, light oil, heating oil, heavy oil, residual oil, paraffin wax, tar and asphalt.

Examples of vegetable oils include rapeseed oil, olive oil, soybean oil, safflower oil, sesame oil, palm oil, sunflower oil, coconut oil, cacao butter, castor oil, oleic acid, α-linolenic acid, linoleic acid, corn oil, cottonseed oil, palm oil and peanut oil.

Examples of animal oils and fats include liver oil, ghee, fish oil, whale oil, Schmalz, suet, chicken fat, butter, tallow and lard.

The amount of the oil absorbed is preferably 0.1-20 g, and more preferably 1-10 g per 1 g of a polycarbonate resin of the present invention.

A solid polycarbonate resin of the present invention has a feature of retaining its shape even after the oil absorption.

According to the present invention, an oil absorption is determined as follows.

One gram of a resin for absorbing an oil is immersed in the oil to be absorbed at room temperature and then taken out to measure its weight to calculate the oil-absorbing multiplication ratio following the equation below.

Oil absorption (g/g)=(Specimen weight after immersion−Specimen weight before immersion)/Specimen weight before immersion <Water Absorption>

A water absorption of a polycarbonate resin of the present invention is preferably 10% by weight or less and more preferably 2% or less. According to the present invention, a method for determining the water absorption follows JIS K 7209: 2000.

<Ratio of Oil Absorption and Water Absorption>

One feature of a polycarbonate resin of the present invention is the large ratio between the oil absorption and the water absorption. "Oil absorption/water absorption" is preferably 1-1,000 and more preferably 300-900.

<Specific Gravity>

A specific gravity of a polycarbonate resin of the present invention is preferably 2 g/cm$^3$ or less and particularly preferably less than 1 g/cm$^3$. According to the present invention, a method for determining a specific gravity follows JIS Z 8807: 2012.

<Oil-Adsorbing Material>

Since a polycarbonate resin of the present invention absorbs oil well, it can be used as an oil-adsorbing material. Due to low water absorption, a polycarbonate resin of the present invention can absorb oil well rather than water even when it is thrown onto a surface of water.

Among the polycarbonate resins of the present invention, solid types, which can retain their shapes even after the oil absorption, can be used to facilitate recovery after the oil absorption.

On the other hand, liquid or viscous types can be used to recover oil in narrow gap.

EXAMPLES

Hereinafter, the present invention will be described by way of examples although the present invention should not be limited in any way to these examples. The measured values in the examples were determined using the following methods and devices.

1) Weight-average molecular weight: Shodex Gel Permeation Chromatography (GPC-101) was used with tetrahydrofuran as a packing solvent to produce a calibration curve using a standard polystyrene with a known molecular weight (molecular weight distribution=1). Based on this calibration curve, a weight-average molecular weight was calculated from the retention time of GPC.

2) Oil absorption: One gram of a polycarbonate resin obtained in an example was cut out and immersed in an oil at room temperature, which was taken out every 6 hours to measure its weight to calculate the oil absorption following the equation below.

Oil absorption (g/g)=(Weight after immersion−Specimen weight before immersion)/Specimen weight before immersion 3) Water absorption: One gram of a polycarbonate resin obtained in an example was cut out and immersed in water at room temperature, which was taken out every 6 hours to measure its weight to calculate the water absorption following the equation below.

Water absorption (g/g)=(Weight after immersion−Specimen weight before immersion)/Specimen weight before immersion 4) The method for determining a specific gravity followed JIS Z 8807. The instrument used was ALFA MiRAGE electronic densimeter SD-200L.

Example 1

48.35 g of long-chain aliphatic diol with a carbon number of 36, represented by Formula (2) wherein a+b+c+d is 30, and 19.61 g of diphenyl carbonate (hereinafter, abbreviated as DPC) were placed in a 300 ml four-neck glass flask reactor, to which 30 μmol of a catalyst (sodium hydrogen carbonate) was added. Heating was conducted with an oil bath to initiate transesterification reaction from 200° C.

Five minutes after the initiation of the reaction, stirring was started and after 20 minutes, the pressure was reduced from 760 Torr to 200 Torr spending 10 minutes. The temperature was increased to 210° C. while reducing the pressure. The temperature was increased to 220° C. 70 minutes after the reaction initiation, and 80 minutes after the reaction initiation, the pressure was reduced to 150 Torr spending 30 minutes. The temperature was increased to 240° C. while the pressure was reduced to 1 Torr. Then, after retaining for 10 minutes, a polycarbonate resin was obtained.

The resulting polycarbonate resin had a weight-average molecular weight of 240,000. It had an elastic solid body at room temperature. The specific gravity was 0.94 g/cm$^3$.

Example 2

A procedure similar to Example 1 was carried out except that the amounts of long-chain aliphatic diol with a carbon number of 36 and DPC were changed to 48.12 g and 22.56 g, respectively, to obtain a polycarbonate resin. This resin had a weight-average molecular weight of 14,000. The resulting polycarbonate resin had a viscous body at room temperature and floated on water.

Example 3

Polymerization was conducted on a larger scale with a 50 L oil jacket reactor. 20.0 kg of long-chain aliphatic diol with a carbon number of 36, represented by Formula (2) wherein a+b+c+d is 30, and 8.1 kg of DPC were placed in the reactor, then to which a sodium hydrogen carbonate solution was added at 6 μmol per molar number of the diol. The temperature of the heat medium was set at 205° C. Ten minutes after it reached 205° C., stirring was started. The pressure was reduced to 205 torr by 30 minutes and phenol distillation was confirmed. Forty minutes after phenol distillation, the pressure was reduced to 180 torr and the temperature was increased to 215° C. Then, 30 minutes later, the pressure was reduced to 150 torr and the temperature was increased to 230° C. Then, 40 minutes later, the pressure was reduced to 120 torr and the temperature was increased to 240° C. 10 minutes later, the pressure was reduced to 100 torr. Once the pressure reached 100 torr, the pressure was reduced to 1 torr or less spending 50 minutes. Thirty minutes after the pressure became 1 torr, the reaction was terminated. The weight-average molecular weight of this resin was 130,000. It had an elastic solid body at room temperature. The specific gravity was 0.94 g/cm$^3$.

Example 4

One gram of the polycarbonate resin obtained in Example 1 was cut out and immersed in kerosen at room temperature. The weight of the swollen specimen was measured to calculate oil absorption based on the equation below. Results are shown in Table 1.

Oil absorption (%)=(Specimen weight after immersion−Specimen weight before immersion)/Specimen weight before immersion×100

Example 5

A procedure similar to Example 4 was carried out except that vegetable oil (Nisshin vegetable oil from Nisshin OilliO Group, ingredients: edible soybean oil and edible rapeseed oil) was used for immersion instead of kerosene. Results are shown in Table 2.

Example 6

A procedure similar to Example 4 was carried out except that water was used for immersion instead of kerosene.

Water absorption (%)=(Specimen weight after immersion−Specimen weight before immersion)/Specimen weight before immersion×100

Results are shown in Table 3.

TABLE 1

| Time h | Weight g | Change in weight g | Oil absorption % |
|---|---|---|---|
| Before immersion | 1.0405 | — | — |
| 6 | 2.5425 | 1.502 | 144 |
| 24 | 4.3849 | 3.3444 | 321 |
| 48 | 5.7552 | 4.7147 | 453 |
| 72 | 6.6998 | 5.6593 | 544 |
| 96 | 7.2026 | 6.1621 | 592 |
| 168 | 7.317 | 6.2765 | 603 |

TABLE 2

| Time h | Weight g | Change in weight g | Oil absorption % |
|---|---|---|---|
| Before immersion | 1.0239 | — | — |
| 6 | 1.281 | 0.2571 | 25 |
| 24 | 1.524 | 0.5001 | 49 |
| 48 | 1.6683 | 0.6444 | 63 |
| 72 | 1.8281 | 0.8042 | 79 |
| 144 | 2.3477 | 1.3238 | 129 |
| 168 | 2.39 | 1.3661 | 133 |

TABLE 3

| Time h | Weight g | Change in weight g | Water absorption % |
|---|---|---|---|
| Before immersion | 1.0511 | — | — |
| 6 | 1.0606 | 0.0095 | 0.9 |
| 24 | 1.0543 | 0.0032 | 0.3 |
| 48 | 1.0613 | 0.0102 | 0.97 |
| 120 | 1.06 | 0.0089 | 0.85 |
| 144 | 1.0641 | 0.013 | 1.24 |
| 168 | 1.0609 | 0.0098 | 0.93 |

Comparative Example 1

A procedure similar to Example 4 was carried out except that a commercially available oil-absorbing mat (oil-adsorbing material Aburatoru sheet from JOHNAN, polypropylene non-woven fabric) was used instead of the polycarbonate resin of the present invention. Results are shown in Table 4.

TABLE 4

| Time h | Weight g | Change in weight g | Oil absorption % |
|---|---|---|---|
| Before immersion | 0.5416 | — | — |
| 6 | 2.9204 | 2.3788 | 439 |
| 24 | 3.1237 | 2.5821 | 477 |
| 48 | 2.3296 | 1.788 | 330 |
| 120 | 3.0011 | 2.4595 | 454 |
| 144 | 2.7732 | 2.2316 | 412 |
| 168 | 2.5988 | 2.0572 | 380 |

Comparative Example 2

A procedure similar to Example 6 was carried out except that a commercially available oil-absorbing mat (polypropylene non-woven fabric) identical to the one used in Comparative Example 1 was used instead of the polycarbonate resin of the present invention. Results are shown in Table 5.

TABLE 5

| Time h | Weight g | Change in weight g | Water absorption % |
|---|---|---|---|
| Before immersion | 0.5665 | — | — |
| 24 | 0.6134 | 0.0469 | 8.28 |
| 96 | 0.6299 | 0.0634 | 11.19 |
| 120 | 0.6389 | 0.0724 | 12.78 |
| 144 | 0.6057 | 0.0392 | 6.92 |
| 168 | 0.6109 | 0.0444 | 7.84 |

INDUSTRIAL APPLICABILITY

Since a polycarbonate resin of the present invention exhibits low water absorption and high oil absorption and floats on water due to a small specific gravity, it can favorably be used as an oil-absorbing material.

The invention claimed is:

1. An oil-absorbing material consisting of a polycarbonate resin comprising a repeating unit represented by Formula (1):

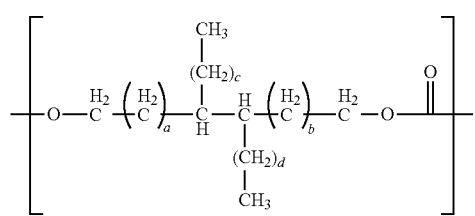

wherein a, b, c and d are each an integer of 0 or higher, and a+b+c+d is 12 to 48, inclusive.

2. The oil-absorbing material according to claim 1, wherein the polycarbonate resin comprises only the repeating unit represented by Formula (1).

3. The oil-absorbing material according to claim 1, wherein a+b+c+d is 30.

4. The oil-absorbing material according to claim 1, wherein the polycarbonate resin has a solid body at 25° C.

5. The oil-absorbing material according to claim 4, wherein the polycarbonate resin has a weight-average molecular weight of 70,000 to 500,000 in terms of polystyrene.

6. The oil-absorbing material according to claim 1, wherein the oil-absorbing material has a viscous body at 25° C.

7. The oil-absorbing material according to claim 6, wherein the polycarbonate resin has a weight-average molecular weight of 10,000 to 30,000 in terms of polystyrene.

8. The oil-absorbing material according to claim 1, wherein the polycarbonate resin has a specific gravity less than 1 g/cm$^3$.

9. A method for producing the oil-absorbing material according to claim 1, comprising using a dihydroxy compound represented by Formula (2) below as a raw material:

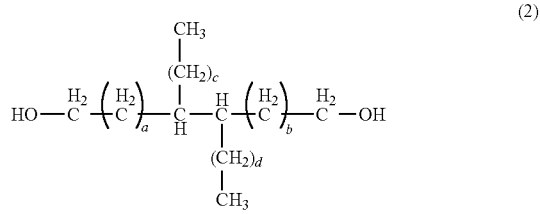

wherein a, b, c and d are each an integer of 0 or higher, and a+b+c+d is 12 to 48, inclusive.

* * * * *